US008719777B2

(12) United States Patent
Zedlitz

(10) Patent No.: US 8,719,777 B2

(45) Date of Patent: May 6, 2014

(54) OBJECT, FOR OBJECT-ORIENTED PROGRAMMING, WITH STATE-DEPENDENT BEHAVIORS

(75) Inventor: Albert Zedlitz, Wiesloch (DE)

(73) Assignee: SAP AG, Walldorf (DE)

( * ) Notice: Subject to any disclaimer, the term of this patent is extended or adjusted under 35 U.S.C. 154(b) by 821 days.

(21) Appl. No.: 12/951,830

(22) Filed: Nov. 22, 2010

(65) Prior Publication Data

US 2012/0131551 A1 May 24, 2012

(51) Int. Cl.
*G06F 9/44* (2006.01)

(52) U.S. Cl.
CPC .............. *G06F 9/4433* (2013.01); *G06F 9/443* (2013.01); *G06F 9/4428* (2013.01); *G06F 8/24* (2013.01); *G06F 8/315* (2013.01)
USPC ............................ 717/116; 717/108; 717/117

(58) Field of Classification Search
CPC ......... G06F 8/24; G06F 8/315; G06F 9/4428; G06F 9/443; G06F 9/4433; G06F 9/548
USPC .................................................. 717/100–178
See application file for complete search history.

(56) References Cited

U.S. PATENT DOCUMENTS 5,907,847 A * 5/1999 Goldberg .............................. 1/1
6,567,819 B1 * 5/2003 Cheng et al. .......................... 1/1
6,898,714 B1 * 5/2005 Nadalin et al. .................... 726/5
7,024,656 B1 * 4/2006 Ahad ............................ 717/116
7,152,070 B1 * 12/2006 Musick et al. ........................ 1/1
2002/0199031 A1 * 12/2002 Rust et al. ..................... 709/315
2003/0056195 A1 * 3/2003 Hunt ............................. 717/116
2003/0115196 A1 * 6/2003 Boreham et al. .................. 707/4
2005/0108724 A1 * 5/2005 Sterling et al. ................ 719/315
2005/0216885 A1 * 9/2005 Ireland .......................... 717/108
2005/0240912 A1 * 10/2005 Bodin et al. .................. 717/143
2005/0246716 A1 * 11/2005 Smith et al. ................... 719/315
2008/0127070 A1 * 5/2008 Barcia et al. .................. 717/116
2008/0263514 A1 * 10/2008 DeMesa et al. ............... 717/105
2009/0133006 A1 * 5/2009 Cheung ......................... 717/144
2009/0231352 A1 * 9/2009 Bhatt et al. ..................... 345/581
2009/0248727 A1 * 10/2009 Hughes ......................... 707/101
2009/0300062 A1 * 12/2009 Joguet et al. .............. 707/103 R
2009/0328017 A1 * 12/2009 Larsen et al. ................. 717/146
2010/0083219 A1 * 4/2010 Tavares et al. ................ 717/107
2010/0299659 A1 * 11/2010 Kirshnaswamy et al. .... 717/147
2012/0117531 A1 * 5/2012 Rosenbaum et al. ......... 717/100

OTHER PUBLICATIONS

Reuse of Off-the-Shelf Components Lecture Notes in Computer Science—Improving Extensibility of Object-Oriented Frameworks with Aspect-Oriented Programming—Uirá Kulesza, Vander Alves, Alessandro Garcia, Carlos J.P. de Lucena, and Paulo Borba—2006, pp. 231-245.*

* cited by examiner

*Primary Examiner* — Lewis A Bullock, Jr.
*Assistant Examiner* — Francisco Aponte
(74) *Attorney, Agent, or Firm* — Schwegman, Lundberg & Woessner, P.A.

(57) ABSTRACT

An object oriented programming environment with an improved object, referred to herein as a "peculiar object", which among other things, facilitates the implementation of a defined transition between object types is described. A peculiar object includes a programming construct referred to herein as a selector, which maps a set of object behaviors to a set of values for a special type of attribute, referred to herein as a "peculiar attribute." As such, as the value of a peculiar attribute changes, so too does the type or state of the peculiar object. With each transition of the object from one type or state to another, the available behaviors dynamically change.

16 Claims, 5 Drawing Sheets

```
      peculiar <type> <peculiar class name>[.<attribute>]

example:
      peculiar int TPloygon.numberOfPoints;
      peculiar int TPerson.age;
      peculiar class TPerson;
```

FIGURE 3A

```
      class  TPloygon {
            peculiar int numberOfPoints;
            ...
      }
      peculiar class TPerson {
            peculiar int age;
            ...
      }
```

FIGURE 3B

```
      peculiar <identifier><<base class>[.attribute]>: <list of types>

example:
```

30

```
      peculiar TArea<TPloygon.numberOfPoints>: TTriangle, TQuadrangle {
            TArea() {
                  switch (TPloygon.numberOfPoints) {
                  case 3: return TTriangle;
                  case 4: return TQuadrangle;
                  default: return null;
            };

            peculiar TTriangle {
            ...
            };

      }
      peculiar TArea.TQuadangle:
            TRectangle, TSquare {
      ...
      };
```

32

```
      peculiar TCareer<TPerson>: TEmployee, TBoss {
      ...
      };
```

34

```
      peculiar TLegal<TPerson.age>: TAdult, TChild {
      ...
      };
```

FIGURE 3C

```
TSquare aSquare = new TSquare( );          // create a square
TPolygon aPolygon = new TPolygon( );       // create a polygon
TArea aArea<aPolygon>;                     // peculiar evaluation
```

FIGURE 4A

```
// Check if aArea is of type TTriangle
if (aTriangle = aArea.TTriangle) {
      aTriangle.print( );
}

// Switch for all types of aArea
switch (aArea) {
      case TTriangle:
            aArea.TTriangle.print( );
            break;
      ...
}

// Print the most peculiar type
aArea.print( );
```

FIGURE 4B

```
Iterator aIt = aLegalPerson.history( );
Iterator aIt = aLegalPerson<TChild>.history( );
Iterator aIt = aArea.history( );
```

FIGURE 4C

OBJECT, FOR OBJECT-ORIENTED PROGRAMMING, WITH STATE-DEPENDENT BEHAVIORS

TECHNICAL FIELD

The present disclosure generally relates to software development. More specifically, the present disclosure relates to an object oriented programming environment with an improved object, referred to herein as a "peculiar" object, which among other things, facilitates the implementation of a defined transition between object types.

BACKGROUND

In object-oriented programming (OOP), the concept of "inheritance" offers a way to compartmentalize and reuse code by creating collections of attributes and behaviors called objects, which can be based on previously created objects. In a classical inheritance scheme, objects are defined by classes, and classes can inherit other classes. The new classes, known as sub-classes (or derived classes), inherit attributes and behaviors of the pre-existing classes, which are referred to as super-classes (or ancestor classes). The inheritance relationship of sub- and super-classes gives rise to a hierarchy of classes, or objects. Although the concept seems quite clear and useful in theory, in actual practice a whole host of problems may arise.

First, the practical application of inheritance in an object oriented approach results in the atomization of objects, which, if taken to the extreme, can ultimately result in an unmanageable number of individual objects. This problem is known to exist in relation to the Hypertext Markup Language (HTML) constructor set, for which each single tag of an HTML page has its own class representation, making it nearly impossible to design an HTML page using the concept. Another problem that frequently arises is the misuse of inheritance as a replacement for type definition. This problem is exhibited, for example, by the overuse of object derivations of the Exception class, "java.lang.Exception." Yet another set of problems arise when an object oriented approach allows for the concept of multiple inheritance. For instance, multiple inheritances often results in problems involving semantic ambiguity, the inability to explicitly inherit multiple items from a single class, and class semantics changing due to the order of inheritance.

Another problem with conventional object oriented programming approaches is the inability to map objects to transient entities. Take for example the model shown in FIG. 1, which shows the classes "CHILD" and "ADULT" as specializations of the class, "PERSON". As a child ages, he or she becomes an adult. However, the model shown in FIG. 1, which is consistent with conventional approaches to object oriented languages and programming, does not define when or what happens if a child becomes an adult as a result of an increase in an attribute, "age". In this simplified example, the transition that naturally occurs is quite obvious. However, in practice, the transition that occurs may be less perceptible.

DESCRIPTION OF THE DRAWINGS

Some embodiments are illustrated by way of example and not limitation in the figures of the accompanying drawings, in which:

FIGS. 3A, 3B and 3C illustrate examples of software instructions showing the programming syntax that might be used to define peculiar attributes and a peculiar class, according to some embodiments of the invention;

FIGS. 4A, 4B and 4C illustrate examples of software instructions showing the programming syntax that might be used to utilize peculiar attributes and a peculiar class, according to some embodiments of the invention.

SUMMARY

Figure 1:
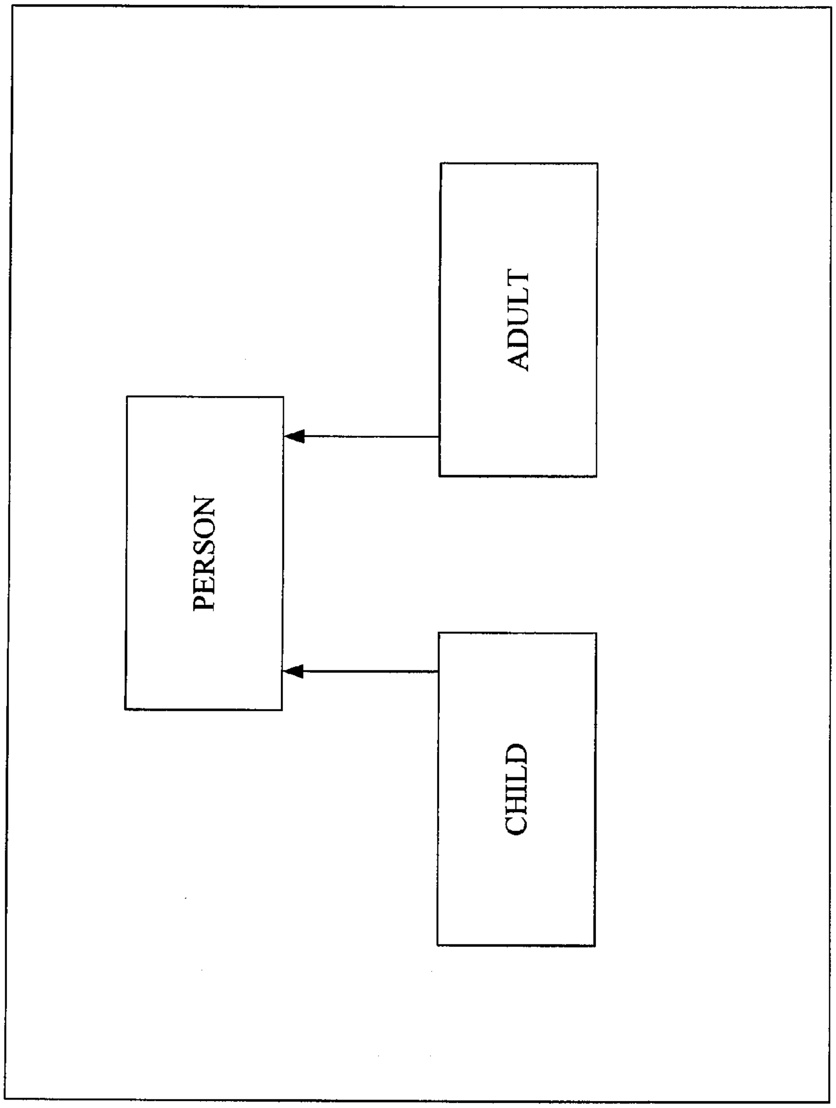
FIG. 1 is a block diagram illustrating an example of an object model, consistent with the prior art, which shows two classes, Child and Adult, derived as specializations of the parent-class, Person.

The present disclosure describes an object oriented programming environment with an improved object, referred to herein as a "peculiar" object, which among other things, facilitates the implementation of a defined transition between object types. In contrast to a conventional object, which may have a set of static behaviors (e.g., implemented as methods) defined for the object, a peculiar object includes a programming construct referred to herein as a "selector" or "selector statement," which maps a set of behaviors to different values of a special type of attribute, referred to herein as a "peculiar attribute." Accordingly, consistent with some embodiments of the invention, the particular behaviors that might be invoked for a peculiar object are dependent upon the value assigned to a peculiar attribute. Therefore, during runtime, the available behaviors of the object are dependent upon the state of the object's peculiar attributes. The object can therefore be transitioned easily from one type or state to another by simply changing the value of an object's peculiar attributes.

Consistent with some embodiments of the invention, a peculiar object includes an intrinsic behavior, referred to herein as a History method. When invoked, this History method allows for generating a time lapsed view of each transition that an object makes. For example, invoking the History method for a particular peculiar object causes a timestamp indicating the time that a particular peculiar attribute changed values, as well as the before and after values of the peculiar attribute, to be displayed. Other aspects of the inventive subject matter are presented below in connection with the description of the attached Figures.

DETAILED DESCRIPTION

The present disclosure describes an object oriented programming environment with an improved object, referred to herein as a "peculiar" object, which among other things, facilitates the implementation of a defined transition between object types. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

In the context of object-oriented programming and for purposes of the present disclosure, an object is a compilation of attributes (e.g., object elements) and behaviors (e.g., methods or subroutines) encapsulating an entity. In general, an object attribute is a property or characteristic of an object.

Color, for example, might be an attribute of an object, such as an automobile. An object's behavior can be thought of as an action that the object can perform. For instance, in the example of the automobile as an object, the automobile object may be able to drive forward, and/or drive in reverse. Behaviors are generally implemented as methods and consist of a sequence of programming statements to carry out the respective action, a set of input parameters to customize the particular action, and possibly an output value, referred to as a return value.

For purposes of the present disclosure, the term "peculiar object" is used to refer to a special type of object. Specifically, a peculiar object is an object that is defined to possess or include at least one special type of attribute, referred to herein as a "peculiar attribute." In addition, the class definition for a peculiar object maps specific behaviors to specific values of the peculiar attribute. At least in some embodiments, these behaviors are implemented as executable methods. The mapping is referred to herein as a "selector" or "selector statement" and is similar in nature and form to the well-known concept of a constructor or constructor statement. For instance, in some embodiments, the selector is implemented as a switch statement—a type of selection control statement that exists to allow the value of a variable (in this case, the peculiar attribute) to control the flow of program execution. Accordingly, when a peculiar object is instantiated at runtime based on its class definition, the particular behaviors (e.g., executable methods) that may be invoked for the peculiar object will be determined by evaluating the peculiar attribute.

In object-oriented programming, and for purposes of the present disclosure, an object attribute is a changeable property or characteristic of an object that can be set to different values. As the term is used herein, a "peculiar attribute" is a special type of object attribute. A peculiar attribute has the same general properties of a conventional object attribute, but differs from a conventional attribute in that an object that is defined to possess or have a peculiar attribute (i.e., a peculiar object) will have different behaviors (e.g., executable methods) available depending upon the value of the peculiar attribute. Stated differently, a peculiar attribute is an attribute whose value determines which behaviors (e.g., implemented as methods), of multiple behaviors defined for an object, are to be carried out, or executed. The determination of which behavior is applicable (i.e., which method is to be executed) for an object is made at runtime, based on the evaluation of the value assigned to the peculiar attribute.

Consistent with some embodiments of the invention, the concept of a peculiar object solves many of the issues that arise with conventional objects, as discussed above in the Background section. Specifically, and as described in greater detail below, peculiar objects allow for the implementation of a defined transition between object types, and provide for a simple way to extend or even overlap object definitions. For instance, a defined transition between object types may be achieved by defining certain behaviours for an object that are applicable to certain values of a peculiar attribute. If the peculiar object is representative of a person, and the peculiar attribute is for a person's age, the various behaviors (e.g., implemented as methods) available for the peculiar object can be defined to be dependent upon the peculiar attribute for age.

Additionally, peculiar objects allow for the implementation, albeit in a different manner, of some facets of aspect-oriented programming. In particular, using peculiar objects, a class can be implemented such that the class can call different methods according to the value assigned to a peculiar attribute, which might be associated with an environment variable. For instance, the evaluation of the peculiar attribute may dictate the version of a particular method that is called. Peculiar objects can overwrite existing methods or implement new ones. The runtime uses the same mechanism for resolving method calls, as it would for overloaded methods in inherited hierarchies. The peculiar definition does not create new objects, but instead, creates an aspect for existing objects.

Figure 2:
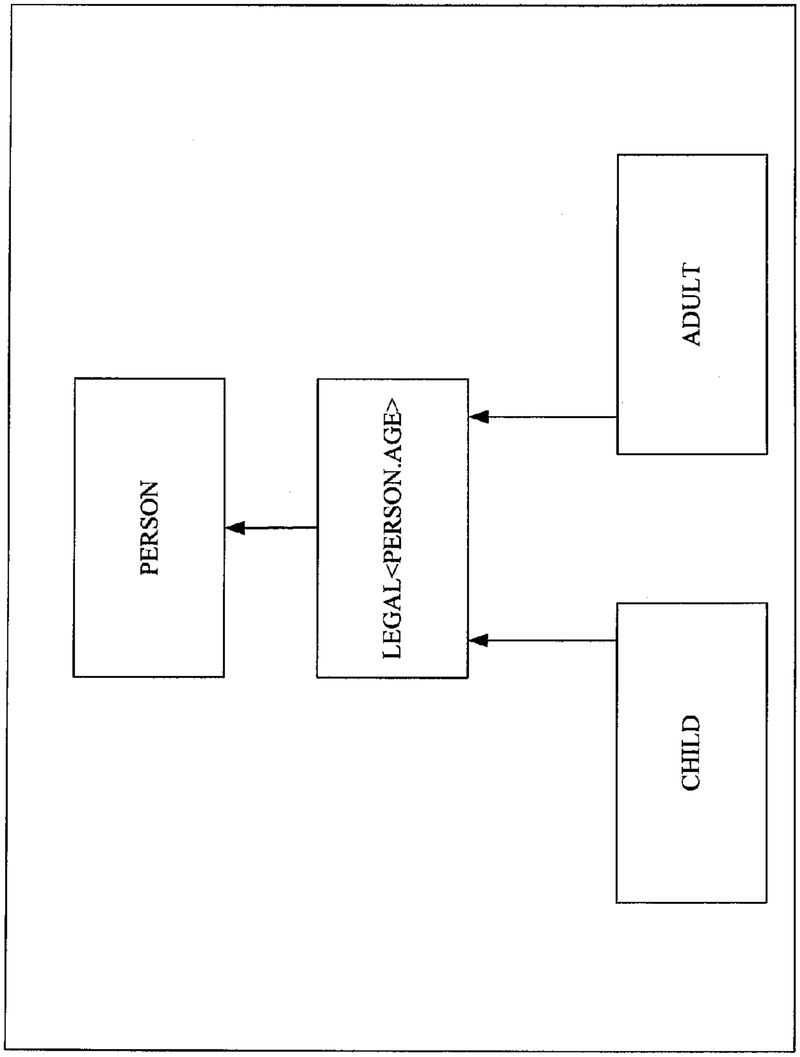
FIG. 2 is a block diagram illustrating an example of an object model, consistent with some embodiments of the invention, which shows two classes, Child and Adult, derived as specializations of the peculiar parent-class Person, having the peculiar attribute, age (e.g., Person.age)
Figure 5:
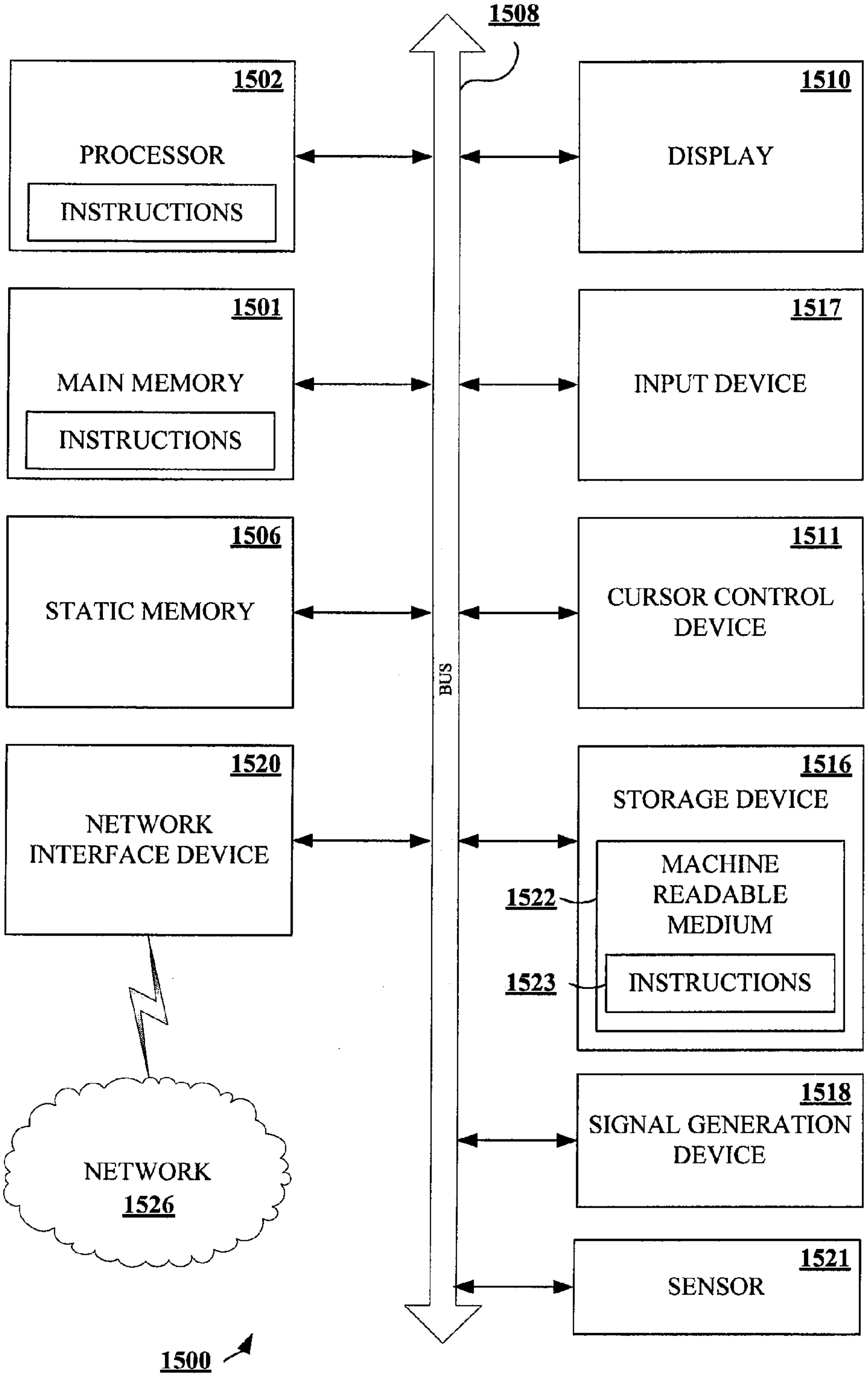
FIG. 5 is a block diagram of a machine in the form of a computing device within which a set of instructions, for causing the machine to perform any one or more of the methodologies discussed herein, may be executed.

Consistent with some embodiments, the definition for a peculiar object is somewhat similar to a class definition. However, where a conventional class includes a constructor, a peculiar object definition includes what is referred to herein as a "selector," which is to return one of a set of named destinations representing the mechanism by which a corresponding behaviour can be invoked. For instance, assuming that the parameter "age" could be used as a selector for an object, the derivation of classes, "ADULT" and "CHILD" might be modelled as shown in FIG. 2. As such, when a class based on the class definition for "PERSON" is instantiated, the resulting object is dependent upon the attribute "PERSON.AGE".

Consistent with some embodiments of the invention, peculiarity can be ascribed to an attribute (e.g., a peculiar attribute) or to a class (e.g., a peculiar class). In essence, a peculiar class definition defines the mapping of behaviours (e.g., implemented as executable methods) to values of a peculiar attribute. A peculiar class definition is substantially similar to a conventional interface—that is, a set of behaviours implemented as executable methods for a class—and as such, many programmers will be generally comfortable with the concept. Moreover, as with a conventional interface, a peculiar class definition should be exported and protected. FIG. 3A illustrates an example of programming syntax that might be used to define peculiar attributes and a peculiar class, according to an embodiment of the invention.

Once a peculiar attribute and/or peculiar class has been defined, the respective peculiar class can be quite easily implemented to include the peculiar attribute. FIG. 3B illustrates an example of programming syntax for implementing classes "TPolygon" and "TPerson" with the peculiar attributes "numberOfPoints" and "age" respectively.

FIG. 3C illustrates an example, consistent with some embodiments of the invention, of programming syntax for defining types. As illustrated in FIG. 3C, the first example statement with reference number 30 defines an area (e.g. "TArea") as a peculiar polygon, which allows distinguishing between the various types of polygons, for example, triangles and quadrangles. In the second statement, with reference number 32, a role is indicated for a career. Specifically, a career (e.g., "TCareer") is defined to include two types (e.g., roles), including a first role, employee (e.g., "TEmployee") and a second role, boss (e.g., "TBoss"). Finally, in the third statement with reference number 34, a legal view on a person to distinguish between an adult and a child is defined.

In each example, the first statement, which appears similar to a constructor in a conventional class definition, is herein referred to as a selector. Consistent with embodiments of the invention, a selector is to return one of the types listed after the respective colon in the selector statement. For instance, in the example with reference number 32, the selector is to return either type "TEmployee" or type "TBoss". Each peculiar type also has an implementation portion, represented in FIG. 3C with an ellipse (e.g., " . . . "). Accordingly, the class definition has public access to the base class and can define new methods, overload existing methods and/or add newly defined attributes.

Consistent with some embodiments of the invention, a peculiar class definition may exclude an instructor in favor of a constructor. That is, the initial statement may exclude the list of types following the comma in the selector. This peculiar definition is referred to as final. In such a scenario, the peculiar type generates the base class with defined values for the peculiar attributes. Peculiar attributes are checked by the framework in such a scenario to show up with a consistent setup. The peculiar attributes are to be defined as constants such that evaluation can occur during compile time. Consistent with some embodiments, it is possible to provide a peculiar definition into the same clause, for example, as shown in the case of "TQuadrangle" in the statement with reference number 30 of FIG. 3C. Accordingly, with some embodiments, each peculiar derivation can add new types.

FIG. 4A illustrates example programming syntax for creating final peculiar elements and/or assigning a peculiar attribute to an existing object. For instance, the code snippets shown in FIG. 4A show the creation of a square and a polygon object, respectively, and the evaluation of a peculiar object to determine the area of the peculiar object.

If a peculiar attribute has been assigned to an object, the resulting type can be requested, as illustrated by the example programming syntax shown in FIG. 4B. In this simplified example, if the object has no peculiarity "TTriangle", the operator, "aArea.TTriangle" returns "null".

With some embodiments, multiple peculiar attributes can be added to an object. Accordingly, the peculiar attributes can be used in a manner similar to the role concept. For example, each one of the plurality of peculiar attributes may define some aspect of a role, such that, the various values assigned to the respective attributes define a role for the entity represented by the object. However, unlike a role description, which manages a list of participant entities, peculiar attributes are "attached to" the participant entities. This provides for consistency, because when an object is removed, there is no need to check the roles separately, because the peculiar attribute is part of the object. As such, with peculiar attributes, it is easy to identify and define an object in different roles.

Moreover, using peculiar attributes for the transition of roles, much like the transitions that occur in a person's career or the natural transitions that occur in the life cycle of certain events, transitions can be managed without further interaction. Stated differently and by way of example, using peculiar objects and attributes, the curriculum vitae of a person's career can be managed by the peculiar definitions, and therefore kept in a consistent way.

With some embodiments of the invention, an intrinsic method, referred to as a History method, is provided to find and display a time lapsed view of the transitions that have occurred for an object. An object transitions from one type or state to another each time a peculiar attribute of the object changes value. For instance, if a peculiar object is representative of a person, and the person's age is represented as a peculiar attribute, then each increase in the person's age may result in a transition of the object. As such, with some embodiments, this change is detected and a timestamp is stored in association with the object so as to allow for the recall of the transition event and the time at which it occurred. For instance, a History method may return an iterator of all transitions, showing a timestamp for each change that occurred. Moreover, the iterator search can be restricted to a specific entity, as shown in the example programming syntax of FIG. 4C.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory computer-readable medium having instructions stored thereon, which, when executed by a computer, cause the computer to perform a method comprising:

reading a class definition for an object, the class definition for the object i) defining the object to possess an attribute, and ii) including a mapping of a set of executable behaviors to a set of values for the attribute such that, during runtime, when an executable behavior in the set of executable behaviors is invoked, selection of the process to be executed for the invoked executable behavior is dependent upon the value of the attribute;

instantiating the object consistent with the class definition; and subsequent to instantiating the object consistent with the class definition and responsive to detecting a change in the value of the attribute storing a timestamp indicating the time at which the change was detected, the timestamp stored in association with the object such that an intrinsic history method can recall and display a time lapsed view of transitions that have occurred for the object.

2. The computer-implemented method of claim 1, wherein each executable behavior in the set of executable behaviors is implemented as an invocable method with a corresponding set of executable instructions.

3. The computer-implemented method of claim 1, wherein the attribute is defined as a special type of attribute whose value determines which executable behavior of a set of executable behaviors defined for the object is to be carried out.

4. The computer-implemented method of claim 1, wherein the attribute is defined to be assigned a value based on an environment variable.

5. The computer-implemented method of claim 1, wherein the mapping of the set of executable behaviors to the set of values for the attribute is implemented with a selection control statement.

6. The computer-implemented method of claim 1, wherein the mapping of the set of executable behaviors to the set of values for the attribute effectively defines a transition between two or more object types, each object type associated with a different value of the attribute.

7. The computer-implemented method of claim 1, further comprising:

after instantiating the object consistent with the class definition, detecting that a particular behavior in the set of executable behaviors has been invoked;

evaluating the attribute; and selecting a process corresponding to a particular behavior to be executed based on a result of the evaluation of the attribute.

8. The computer-implemented method of claim 1, wherein the class definition for the object defines an intrinsic history method, which, when invoked, generates a time lapsed view of transitions that have occurred for the object, each transition representing a change in the value of the attribute at a particular time.

9. A computer-implemented method comprising:

detecting a request to instantiate an object corresponding with a class definition;

reading the class definition for the object, the class definition including a selection control statement specifying a set of behaviors that correspond with a set of values for an attribute, each behavior having a corresponding set of executable instructions for carrying out the behavior;

instantiating the object in accordance with the corresponding class definition; and responsive to detecting a change in the value of the attribute, storing a timestamp indicating the time at which the change was detected, the timestamp stored in association with the object such that an intrinsic history method can recall and display a time lapsed view of transitions that have occurred for the object.

10. The computer-implemented method of claim 9, further comprising:

detecting that a particular behavior in the set of executable behaviors has been invoked;

evaluating the attribute; and selecting a set of executable instructions corresponding with the particular behavior to be executed based on a result of the evaluation of the attribute.

11. The computer-implemented method of claim 9, wherein each behavior in the set of behaviors is implemented as an invocable method.

12. The computer-implemented method of claim 9, wherein the attribute is defined as a special type of attribute whose value determines which behavior of the set of behaviors defined for the object is to be carried out.

13. The computer-implemented method of claim 9, wherein the attribute is defined to be assigned a value based on an environment variable.

14. The computer-implemented method of claim 9, wherein the selection control statement is a switch statement that maps the set of behaviors to the set of values for the attribute.

15. The computer-implemented method of claim 14, wherein the mapping of the set of executable behaviors to the set of values for the attribute effectively defines a transition between two or more object types, each object type associated with a different value of the attribute.

16. The computer-implemented method of claim 9, wherein the class definition for the object defines an intrinsic history method, which, when invoked, generates a time lapsed view of transitions that have occurred for the object, each transition representing a change in the value of the attribute at a particular time.

* * * * *